United States Patent
Sasaki et al.

(10) Patent No.: US 6,515,698 B1
(45) Date of Patent: *Feb. 4, 2003

(54) IMAGE RECORDING APPARATUS

(75) Inventors: Takashi Sasaki, Kanagawa-ken (JP); Toshihiko Mimura, Kanagawa-ken (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/905,584

(22) Filed: Aug. 4, 1997

Related U.S. Application Data

(62) Division of application No. 08/108,840, filed on Aug. 18, 1993, now Pat. No. 5,719,624, which is a continuation of application No. 07/553,896, filed on Jul. 13, 1990, now abandoned.

(30) Foreign Application Priority Data

| Jul. 18, 1989 | (JP) | ............................................. 1-185320 |
| Jul. 18, 1989 | (JP) | ............................................. 1-186931 |

(51) Int. Cl.⁷ ........................... H04N 5/335; H04N 5/76
(52) U.S. Cl. ................... 348/231.6; 348/273; 386/117
(58) Field of Search .................. 348/207, 231, 348/233, 239, 272, 273, 375, 376, 231.99, 231.3, 231.6, 231.7, 222.1, 230.1, 243; 358/909.1, 906; 386/117, 118

(56) References Cited

U.S. PATENT DOCUMENTS

| 4,175,268 A | * | 11/1979 | Ochi et al. ................... 348/273 |
| 4,837,628 A | * | 6/1989 | Sassaki ........................ 348/231 |
| 5,028,547 A | * | 7/1991 | Iizuka et al. ................. 348/273 |
| 5,034,804 A | * | 7/1991 | Sasaki et al. ................ 348/231 |
| 5,040,068 A | * | 8/1991 | Parulski et al. ............. 348/376 |
| 5,070,406 A | * | 12/1991 | Kinoshita .................... 348/272 |
| 5,153,729 A | * | 10/1992 | Saito .......................... 348/232 |
| 5,684,919 A | * | 11/1997 | Kikuzawa et al. .......... 348/207 |
| 5,719,624 A | * | 2/1998 | Sasaki et al. ................ 348/231 |

FOREIGN PATENT DOCUMENTS

| JP | 59-183592 | 10/1984 | |
| JP | 63-127686 | 5/1988 | |
| JP | 63-131796 | 6/1988 | |
| JP | 63-169882 | * 7/1988 | .......... H04N/5/335 |
| JP | 63-281595 | 11/1988 | |
| JP | 1-176191 | 7/1989 | |
| JP | 1-314078 | 12/1989 | |

* cited by examiner

*Primary Examiner*—Tuan Ho
(74) *Attorney, Agent, or Firm*—Robin, Blecker & Daley

(57) ABSTRACT

An electronic camera includes a memory unit which is arranged to store therein both image data corresponding to an image signal and information indicative of characteristics of an image sensor providing the image signal. In reproduction of the image from the memory unit, the image data is read from the memory unit on the basis of the characteristic data stored in the memory unit and processing characteristics of a signal processor receiving the read image data are also set on the basis of the characteristic data stored in the memory unit.

18 Claims, 14 Drawing Sheets

FIG. 1

$$\begin{pmatrix} W \\ G \\ Ye \\ Cy \end{pmatrix} = \begin{pmatrix} 1 & 1 & 1 \\ 0 & 1 & 0 \\ 1 & 1 & 0 \\ 0 & 1 & 1 \end{pmatrix} \begin{pmatrix} r \\ g \\ b \end{pmatrix}$$

$$\begin{pmatrix} r \\ g \\ b \end{pmatrix} = \begin{pmatrix} 1 & 1 & 1 \\ 0 & 1 & 0 \\ 1 & 1 & 0 \\ 0 & 1 & 1 \end{pmatrix}^{-1} \begin{pmatrix} W \\ G \\ Ye \\ Cy \end{pmatrix}$$

$$\begin{pmatrix} d1 & d2 & d3 & d4 \end{pmatrix} = A$$

$$\begin{pmatrix} y1 \\ y2 \end{pmatrix} = (1,1) \begin{bmatrix} d1 & d3 \\ d2 & d4 \end{bmatrix}$$

$$Gc = \begin{bmatrix} d1 & d2 \\ d3 & d4 \end{bmatrix}$$

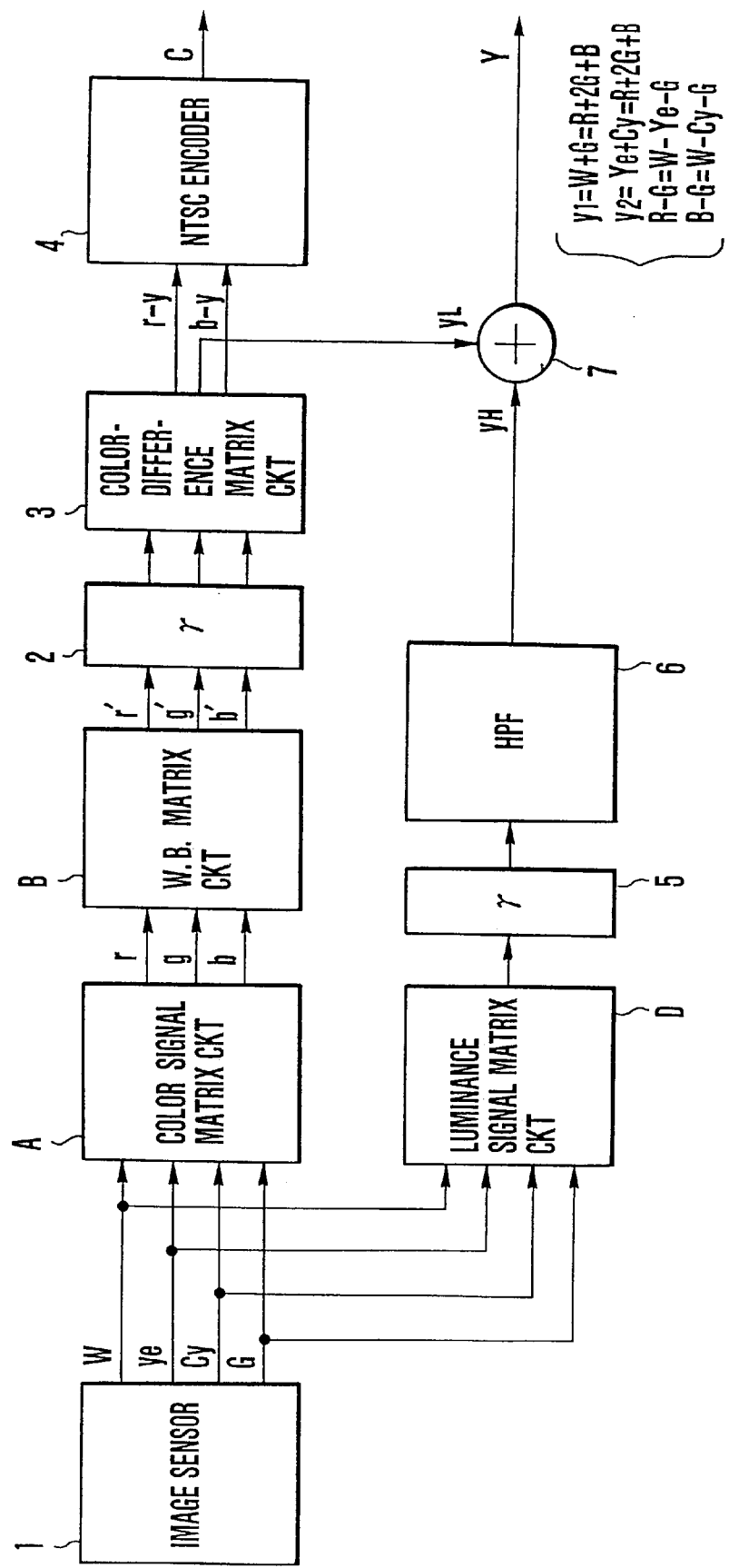

3×12 SIGNAL PROCESSING MATRIX $$\begin{Bmatrix} r \\ g \\ b \end{Bmatrix} = \begin{Bmatrix} a1 & a4 & \text{------} & a34 \\ a2 & a5 & \text{------} & a35 \\ a3 & a6 & \text{------} & a36 \end{Bmatrix} \begin{Bmatrix} d1 \\ d2 \\ \vdots \\ d12 \end{Bmatrix}$$

2x12 SIGNAL PROCESSING MATRIX

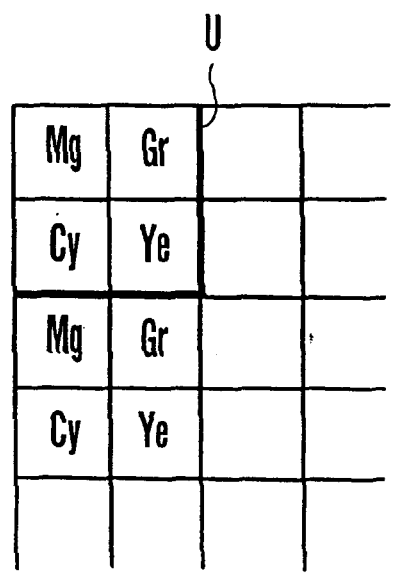
F I G.13(A)
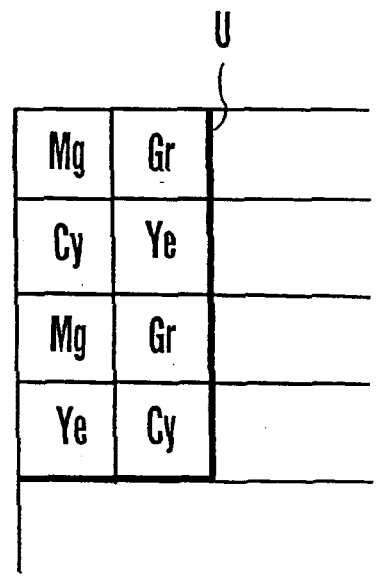
F I G.13(B)
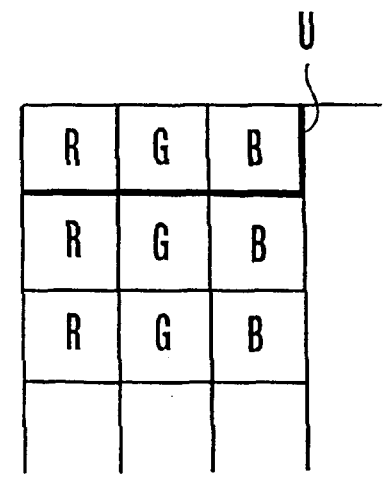
F I G.13(C)

| | NUMBER OF KINDS OF COLOR FILTERS, CN | 301 |
| | NUMBER OF HORIZONTAL PIXELS PER U, Ux | 302 |
| | NUMBER OF VERTICAL PIXELS PER U, Uy | 303 |
| | NUMBER OF COLOR FILTER OF U (i,j) | 304 |

|   | (A) | (B) | (C) |
|---|-----|-----|-----|
| CN | 4 | 4 | 3 |
| Ux | 2 | 2 | 3 |
| Uy | 2 | 4 | 1 |
| 1 | 1 | 1 | 1 |
| 2 | 2 | 2 | 2 |
| 3 | 3 | 3 | 3 |
| 4 | 4 | 4 | — |
| 5 | — | 1 | — |
| 6 | — | 2 | — |
| 7 | — | 4 | — |
| 8 | — | 3 | — |
| 9 | — | — | — |

IMAGE RECORDING APPARATUS

This application is a division, of application Ser. No. 08/108,840, filed Aug. 18, 1993 which is a continuation application of Ser. No. 07/553,896, filed Jul. 13, 1990 (abandoned).

BACKGROUND OF THE INVENTION

1. Field of the Invention

The present invention relates to an image recording apparatus which employs a solid-state image sensor in combination with a color separation filter assembly.

2. Description of the Related Art

Special attention has recently been directed to an apparatus for converting a signal output from a solid-state image sensor into a digital signal, applying digital signal processing to the digital signal, and recording or reproducing the signal as an image. A typical example of such an apparatus is a full-solid-state camera arranged to convert video information into a digital value and record it on a semiconductor memory or the like. In the aforesaid apparatus, it is necessary to execute various kinds of signal processing, depending on the arrangement of a color separation filter assembly attached to the image sensor (hereinafter referred to as a "sensor"). Accordingly, in an electronic camera, video information is converted into a standard signal form which does not depend on the arrangement of the color separation filters, for example, either a luminance signal and color-difference signals or R, G and B signals, and the thus-converted signals are recorded on a semiconductor memory or the like.

However, the aforesaid conventional arrangement has a problem in that information is recorded on the memory in an amount which is larger than the original amount. For example, in an arrangement in which the output of a sensor having general complementary color mosaic filters is fetched into a memory, the memory capacity required for the luminance signal is needed by an amount approximately corresponding to the number of pixels on the sensor since a sampling frequency cannot be reduced. In addition, since it is necessary to convert color-difference signals which are originally obtained in a line-sequential manner into simultaneous signals to be stored, a memory capacity needs to be several times as large as the original amount of information supplied from the sensor. Of course, it is possible to lower the sampling frequency of each of the color-difference signals. However, in order to lower such sampling frequency, a digital filter is needed. Furthermore, since the sampling frequency cannot be lowered below a certain limit, it is difficult to prevent the required memory capacity from increasing to a great extent above the original amount of information supplied from the sensor. The above problem is also experienced with a sensor having pure color stripe filters which will be described later. In order to store the original information on the memory without increasing the amount of information, it is necessary to directly record the information supplied from the sensor. However, since different kinds of color filters require different forms of signal processing, the problem that interchangeability is not assured remains to be solved.

SUMMARY OF THE INVENTION

It is, therefore, an object of the present invention to provide an image recording apparatus which is capable of solving the above-described prior art problem.

To this end, according to one embodiment of the present invention, there is provided an image recording apparatus which comprises a memory for directly storing a color signal supplied from a solid-state image sensor in a memory without applying color signal processing to that color signal, selecting means for selecting block data of arbitrary size from the memory, and a matrix calculation circuit for converting the selected block data into a predetermined color or luminance signal.

In a specific form of the aforesaid embodiment, a reproducing apparatus is provided with an n×m matrix signal processing means for converting a signal supplied from a sensor into R, G and B signals as well as a luminance signal. In recording mode, a recording apparatus is adapted to directly store the signal output form the sensor in its memory and to record on the memory the requisite information such as a conversion matrix constant, information on the lattice arrangement of the sensor, and the number of steps of horizontal and vertical movements. Accordingly, it is possible to produce a signal output having a common form with respect to an arbitrary arrangement of colors.

In accordance with the above-described embodiment, if the signal output from the sensor is substantially directly written to the memory, interchangeability is not impaired and outstanding memory saving can be achieved.

In accordance with another embodiment of the present invention, there is provided an electronic camera which is arranged to record on a detachable memory an image signal and information indicative of the characteristics of an image sensor.

In this embodiment, it is possible to record the output of the image sensor in substantially unprocessed form, whereby image information can be recorded with the amount of information per image reduced. In addition, since information on the property of the image sensor is stored, the stored image information can be readily converted into image information having interchangeability in a final step.

Further objects, features and advantages of the present invention will become apparent form the following detailed description of embodiments of the present invention with reference to the accompanying drawings.

BRIEF DESCRIPTION OF THE DRAWINGS

FIG. 1 is a view showing one example of the arrangement of complementary mosaic filters and corresponding matrix expressions;

FIG. 2 is a block diagram showing the principle of the present invention;

FIGS. 13(A), 13(B) and 13(C) are views showing different examples of the arrangement of color filters;

DETAILED DESCRIPTION OF THE PREFERRED EMBODIMENTS

Figure 3:
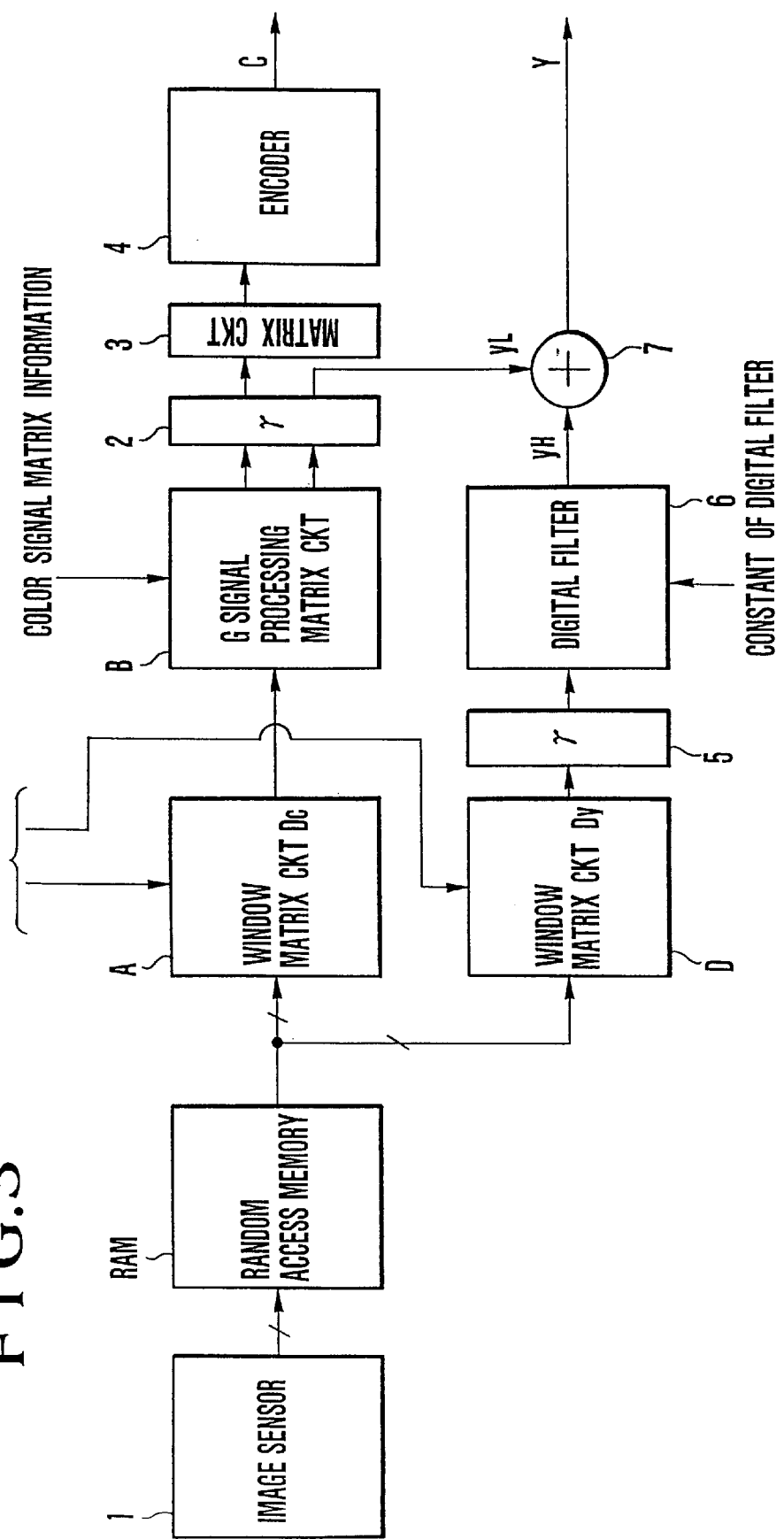
FIG. 3 is block diagram showing one example of an arrangement according to the present invention.

First of all, the principle of matrix signal processing which constitutes the gist of each preferred embodiment will be explained below. In general, electronic cameras, whether single-CCD or two-CCD types, utilize limited kinds of color separation filters: to conduct signal processing which includes the steps of separating the output from an image sensor into R, G and B signals, balancing each of the R, G and B signals for white and converting them into the required signal form.

For example, in an arrangement using the complementary color mosaic filters shown in FIG. 1, a signal processing circuit such as that shown in FIG. 2 is used to effect the following conversions by means of a color signal processing system and a luminance signal processing system, respectively. In the color signal processing system, the output of the image sensor 1 is converted into signals r, g and b by a matrix circuit A. The signals r, g and b are passed through a matrix circuit B having the function of adjusting white balance, a gamma correcting circuit 2 and a color-difference matrix circuit 3, and are in turn supplied to a standard television signal processing encoder 4 which corresponds to NTSC standards, PAL standards, SECAM standards, high definition television (HD) standards or the like. In the luminance signal processing system, the output of the image sensor 1 is converted into a luminance signal by a matrix circuit D and a high-frequency component is extracted from the luminance signal through a gamma correcting circuit 5 and a digital filter (HPF) 6. The high-frequency component and a low-frequency luminance signal supplied from the matrix circuit 3 are synthesized as a luminance signal Y by an adder 7. As is apparent from the foregoing, in order to obtain the required color signal from the image sensor 1, it suffices to utilize matrix information on a G=A×B color signal matrix, whereas, to obtain the corresponding luminance signal, it suffices to provide the matrix circuit D. In actual signal processing, it is further necessary to provide vertical and horizontal subsampling steps. When expressed in another way, since matrix calculations are performed while an n×m matrix is being superimposed on each pixel of the image sensor 1, information on the next pixel position to which the n×m matrix is to be moved is needed. The movement of such matrix which is associated with the matrix calculations will now be described with reference to FIG. 1. It is assumed here that the signals from the respective pixels of the image sensor 1 are arrayed in an x×y matrix on a memory (RAM) so that the signals can be randomly accessed or so that arbitrary signals can be extracted as the data required for matrix calculations by means of a delay line or the like. To begin with, the window matrix Gc shown in FIG. 1 is set to the coordinate points (1, 1) on the x×y matrix, and the matrix calculations shown in FIG. 1 are used to perform calculations on the signals r, g, b and Y. Then, the window matrix Gc is moved in accordance with a sampling step which is prepared in advance. For instance, in the example shown in FIG. 1, the window matrix Gc, which is first located at the coordinate point (1, 1), is moved to the coordinate point (3, 1) after two cycles. This movement is accomplished in accordance with a reset subsampling step =2. If the area of the x×y matrix is preset, the movement of the window matrix Gc can be stopped at the instant when a coordinate point outside the x×y matrix is reached. After a cycle corresponding to one horizontal scanning period has been passed, the x coordinate is reset to its initial position and the window matrix Gc is moved along the y coordinate axis in accordance with a vertical sampling step, whereby signal processing for the next horizontal line is performed.

Figure 4:
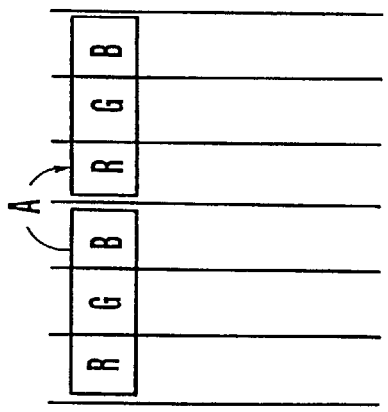
FIG. 4 is a view showing one example of the arrangement of pure color stripe filters and corresponding matrix expressions.
Figure 5:
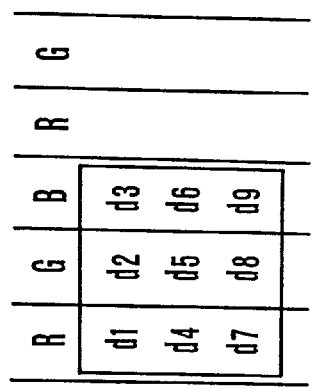
FIG. 5 is a view showing another example of the arrangement of pure color stripe filters and a corresponding luminance signal matrix expression.

The processing of luminance signals is performed in similar manner. Matrix calculations are performed by using the signal processing matrix circuit D which is prepared in association with the window matrix Gc, thereby providing a luminance signal. The window matrix Gc is likewise moved in accordance with the subsampling step so that signal processing similar to that performed on the aforesaid color signal is achieved. As described above, since the window matrix Gc and the signal processing matrix D are prepared in circuit with each other, signals supplied from a mosaic filter assembly and a stripe filter assembly, that is, pure colors and complementary colors, which have conventionally been processed according to different procedures, can be processed merely by switching matrices on an identical hardware arrangement. FIG. 3 is a block diagram showing a signal processing arrangement including window matrices according to the present invention. In FIG. 3, the same reference numerals are used to denote the like or corresponding elements shown in FIG. 2, and the illustrated random access memory (RAM) may be of a fixed or detachable type. FIG. 4 shows one example of a pure color stripe filter assembly and the corresponding matrix. The filter assembly and matrix shown in FIG. 4 will be described below with reference to the hardware arrangement shown in FIG. 3. In the case of the pure color filter, as shown in FIG. 4, the matrix A of FIG. 4 assumes a 3×3 unit matrix, while the luminance signal Y is represented as a 3×1 matrix. This arrangement may also be utilized when the luminance signal Y is to be produced by adding a line signal in order to increase the sensitivity of a sensor incorporated in an electronic movie camera or the like. In this arrangement, as shown in FIG. 5, it is only necessary that the window matrix Gc be expanded in the y direction and that the elements arrayed in the matrix D be increased correspondingly. Accordingly, a signal y1 or y2 may be selected for each field.

In the aforesaid arrangement, the initial coordinates of the window matrix for each field may of course be prepared as coordinate information so as to reduce the matrix. In the case of the luminance signal system, if the size of the window matrix is increased, a vertical enhancer signal can also be output. As a matter of course, it is possible to provide the luminance matrix with the above-described operation.

Figure 6:
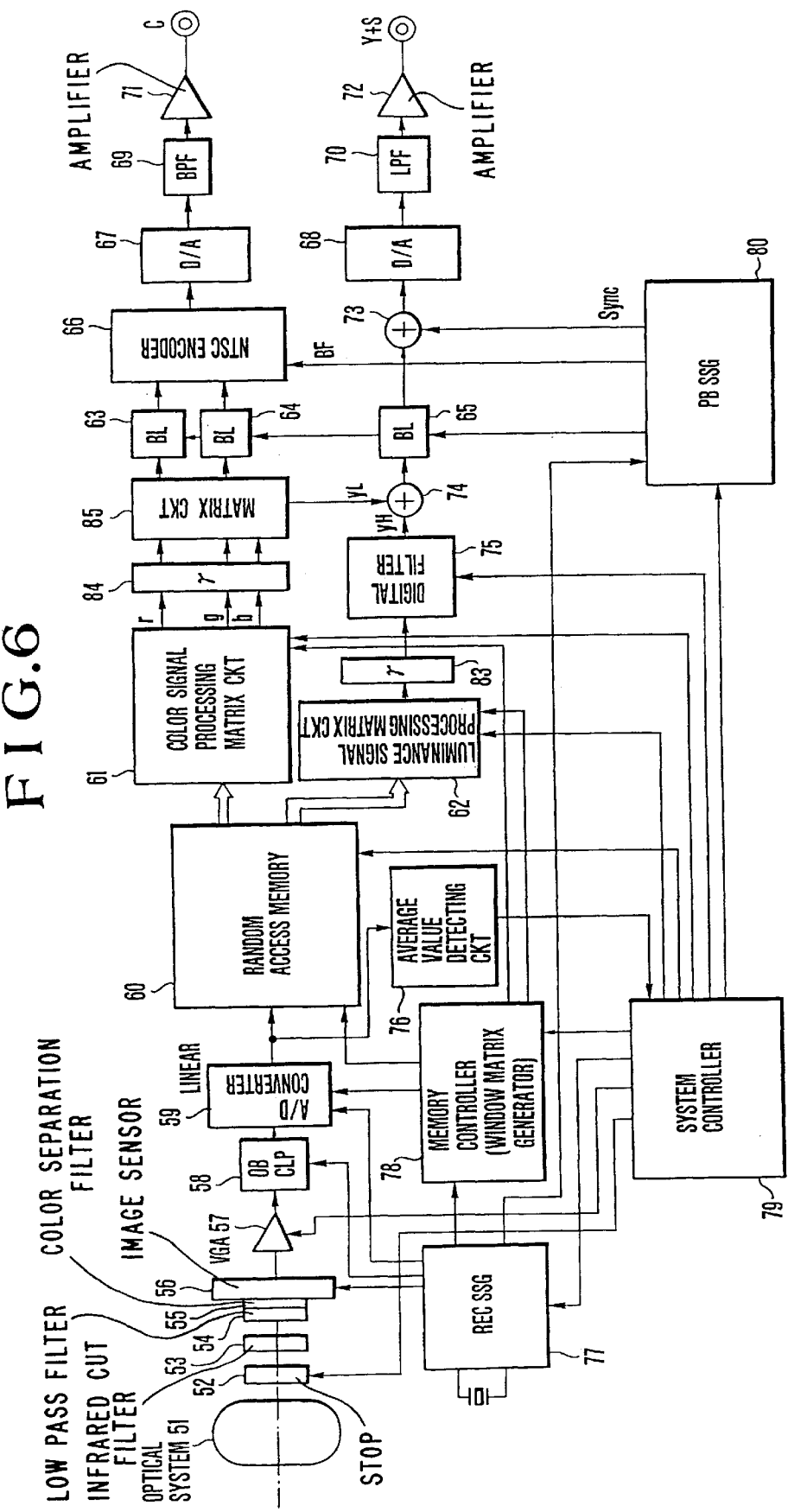
FIG. 6 is a block diagram showing the arrangement of one embodiment of an image recording apparatus according to the present invention.
Figure 7:
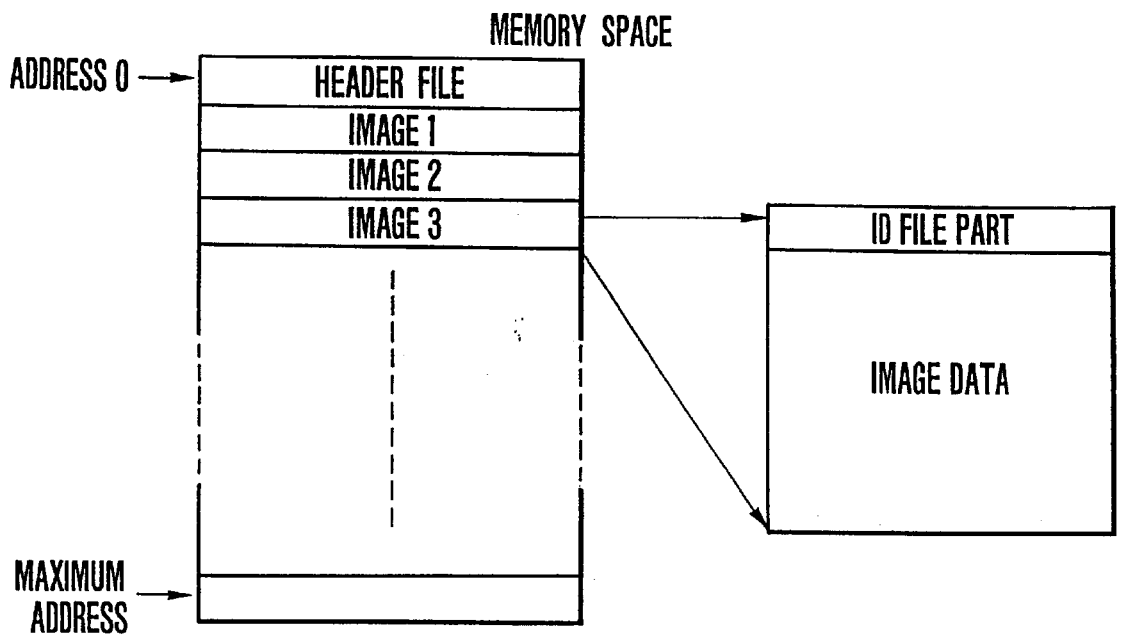
FIG. 7 is a view showing the configuration of a memory space in the embodiment of the present invention.

FIG. 6 is a block diagram of one embodiment of the present invention, and shows one example of a full-solidstate camera which utilizes the aforesaid principle of the present invention, and the operation and arrangement of this camera will be described below. The illustrated camera comprises an optical system 51, a stop 52, an infrared cut filter 53, an optical low-pass filter 54, and a one-chip color separation filter 55. An image, passed through the elements 51 to 55, is formed on a solid-state image sensor 56 using a CCD or the like. The image is converted into electrical charge by the solid-stage image sensor 56. The electrical charge thus obtained is read from the same in synchronism with a signal supplied from a system signal generator (SSG) 77, and is supplied to a variable gain amplifier 57. The variable gain amplifier 57 serves to correct the sensitivity of the solid-stage image sensor 56 which may not be completely adjusted by the stop 52. Simultaneously, the variable gain amplifier 57 effects knee correction. An optical black clamping circuit 58 fixes the black level of the solid-stage image sensor 56. The signal whose black level is fixed as a direct current by the optical black clamping circuit 58, is converted into a digital value by an A/D converter 59. The digital values thus obtained are sequentially stored in a memory 60 in accordance with an address indicated by a controller 78. The memory 60 may be disposed in either a fixed form or a detachable form. An average value detecting circuit 76 is arranged to provide exposure control by utilizing the image sensor output. The average value detecting circuit 76 reads an average value to control the stop 52 and the variable gain amplifier 57, thereby adjusting an exposure level. In the above-described embodiment, an electronic shutter operation is achieved by controlling the timing of driving of the image sensor 56. Also, the above-described embodiment employs a recording format such as that shown in FIG. 7 for writing to the memory 60. As shown in FIG. 7, a header file stores in numerical form the number of recorded images, the titles of the respective images, the property of information other than image information. An ID file part is defined at the head of each image signal recording area. Recorded on the ID file part are various kinds of information such as matrix information supplied from signal processing matrix circuits 61 and 62, the lattice configuration of the solid-state image sensor 56, and the information required for the window matrix, such as subsampling steps. In an area which follows the ID file part, corresponding image data are recorded.

For reproduction, a system controller 79 reads the contents of the ID file part from the memory 60 by means of the controller 78, and obtains matrix constants and a digital filter constant. The system controller 79 transfers the matrix constants to the respective signal processing matrix circuits 61 and 62, and the digital filter constant to a digital filter 75. The system controller 79 also transfers window matrix information or subsampling-step information to the memory controller 78. Thus, the required reproduction conditions are established.

During reproduction, the memory controller 78 generates a window matrix and transfers information corresponding to the position of the window matrix to the color signal processing matrix circuit 61 and the luminance signal processing matrix circuit 62 in accordance with subsampling step. The matrix circuits 61 and 62 perform matrix signal processing on the basis of the matrix information transferred from the ID file part, thereby forming color-difference signals and a luminance signal, respectively. The luminance signal thus formed is then supplied to the digital filter 75, where a high-frequency component $y_H$ is extracted. In the meantime, a low-frequency luminance signal $y_L$ is obtained by subjecting the output of the memory 60 to calculations in the color signal processing matrix circuit 61 and passing the result through a correcting circuit 84 and a matrix circuit 85. The high-frequency component $y_H$ and the low-frequency luminance signal $y_L$ are supplied to an adder 74, where they are synthesized with each other. The output of the adder 74 is subjected to blanking processing in a blanking circuit 65 in accordance with a signal which is supplied from a system signal generator 80 during reproduction. The output of the blanking circuit 65 is supplied to an adder 73, where a synchronizing signal is added to the input signal. The output of the adder 73 is converted into an analog signal by a D/A converter 68, and a subsampling carrier is cut by a low-pass filter 70. The output of the low-pass filter 70 is provided as a luminance signal by an amplifier 72.

Also, the color-difference signals output from the matrix circuit 85 are combined with blanking pulses in blanking circuits 63 and 64, respectively. The outputs of the respective blanking circuits 63 and 64 are converted into a chrominance signal in an NTSC encoder 66. The chrominance signal is converted into an analog signal in a D/A converter 67, and the analog signal is output as a color signal C through a band-pass filter 69 and an amplifier 71. In the above-described arrangement, a digital filter may be disposed after the color signal processing matrix circuit 61.

Figure 8:
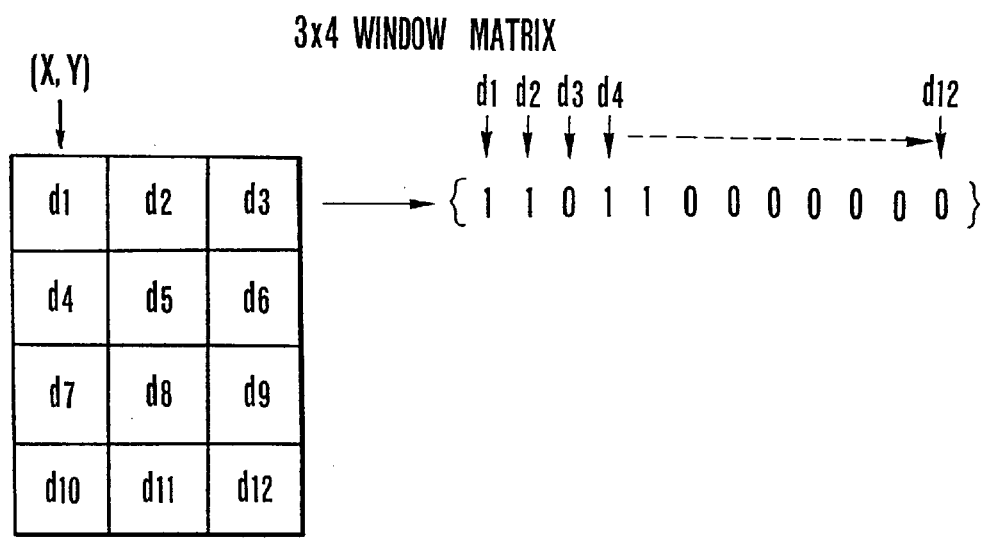
FIG. 8 is a view showing another example of a window matrix according to the embodiment of the present invention.

FIG. 8 shows a 3×4 matrix which constitutes a part of the n×m matrix according to the present invention. The required data, which is obtained from a random access memory, is made to correspond to the elements $d_1$ to $d_{12}$ of the signal processing matrix in the window matrix. The resultant signal form is a one-bit signal form such as that shown in FIG. 8. Relevant data is selected by using the one-bit signal form, and information for setting start coordinates and information on sampling steps are also needed as signals for controlling this window matrix.

Figures 9, 10:
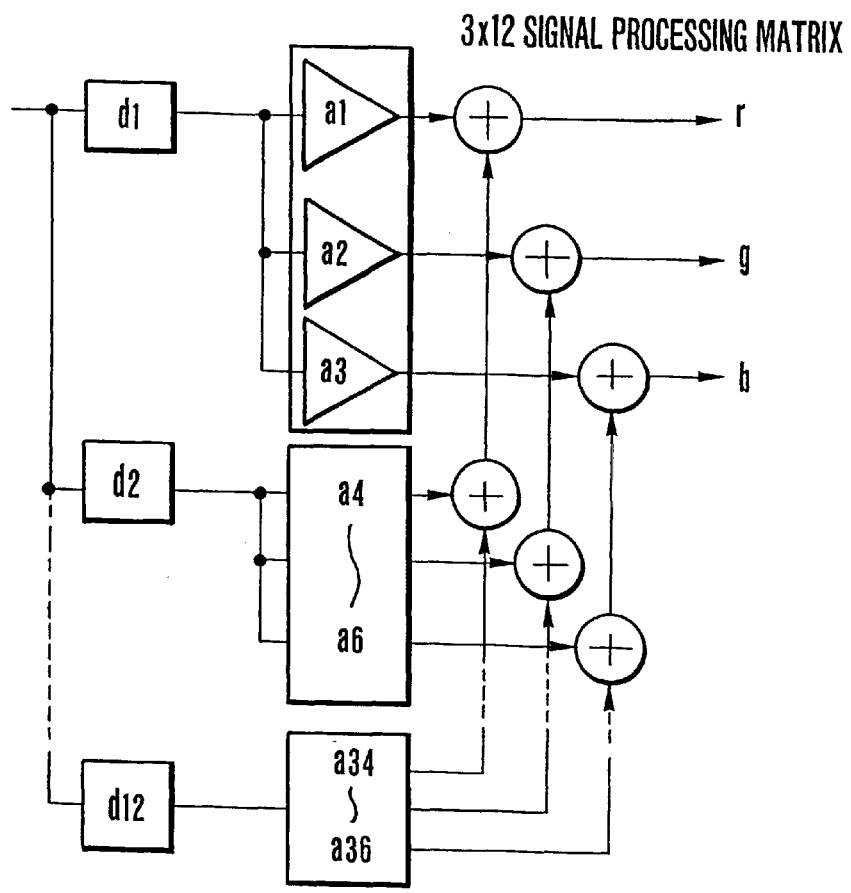
FIG. 9 is a block diagram showing one example of a color signal processing matrix circuit for use in the embodiment of the present invention.
FIG. 10 is a view showing one example of a color signal matrix expression which corresponds to the circuit of FIG. 9.

The thus-obtained signal is supplied to a 3×12 signal processing circuit such as that shown in FIG. 9, subjected to matrix calculations such as those shown in FIG. 10, and output as the signals r, g and b. The values of constants $a_1$ to $a_{36}$ take on values which are inherent in the image sensor and which allow for white balance information, a signal processing method, the characteristics of the color separation filter assembly and the like.

Although in the above description the window matrix is an n×m matrix, the window matrix is not limited to such a rectangular configuration. For example, a window having an arbitrary configuration consisting of t elements may be employed. This explanation also applies to a matrix for luminance signal processing.

Figure 11:
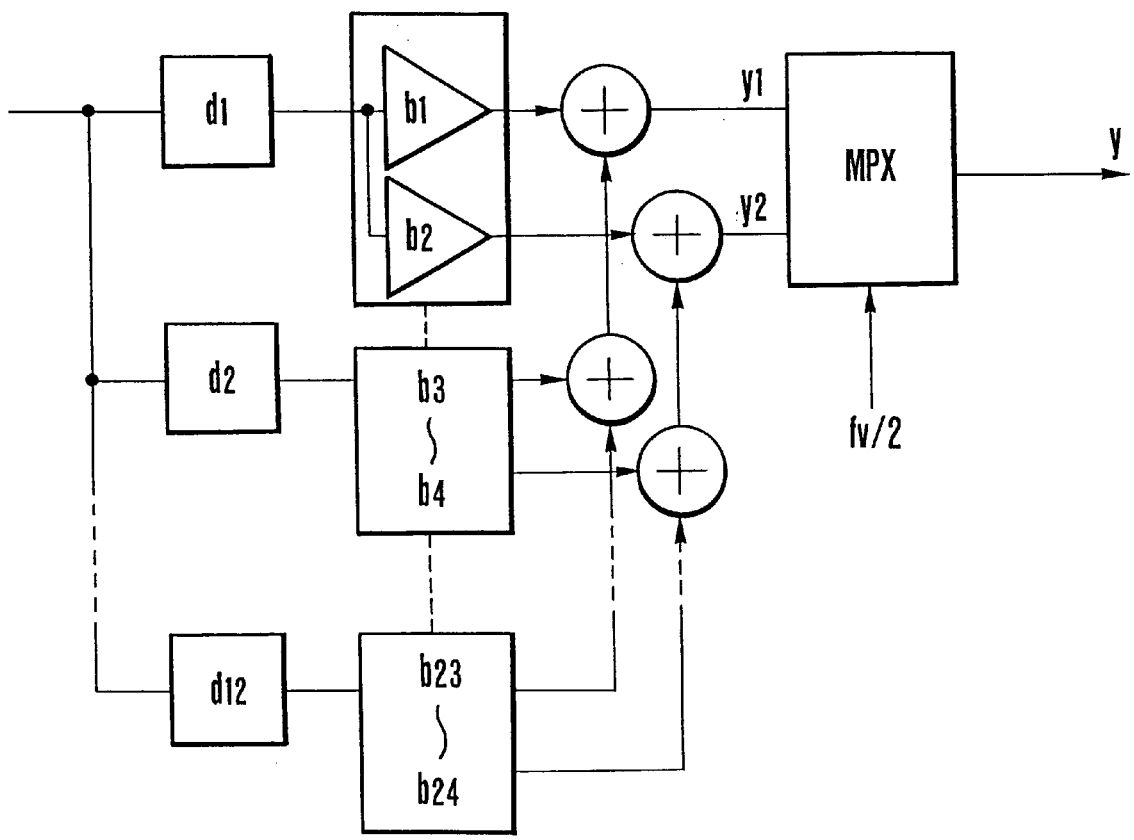
FIG. 11 is a view showing one example of a luminance signal processing matrix circuit for use in the embodiment of the present invention.

FIG. 11 shows an example of a luminance signal processing matrix circuit, and the illustrated example is a 2×12 matrix. The signals $y_1$ and $Y_2$ represent the results obtained by effecting signal processing for first and second fields, respectively. These signals $y_1$ and $Y_2$ are switched by a multiplexer MPX for each field and are alternately output. The corresponding constants $b_1$ to $b_{24}$ are constants which indicate the white balance of the luminance signal system, luminance difference correcting information, and information on the vertical enhancer signal or the like.

The luminance signal matrix can also be constructed as a k×j matrix, where k and j are natural numbers, respectively, and the present invention is not limited to the 2×12 matrix used in the above-described embodiment. If the k×j matrix and the m×n matrix are identical to each other, a common latch may be disposed before the corresponding signal processing circuits. In addition, if the signal processing circuits can operate at sufficiently high speeds, a common signal processing circuit which can operate on a time-shared basis may be used.

Although the above-described embodiment is arranged so that the required data are directly stored in the memory RAM, the data may of course be stored in a compressed form and reproduced in an expanded form.

The above-described embodiment has a number of advantages. For example, signal processing circuits, which have conventionally depended on the arrangements of individual color separating filters for use with an image sensor, can be constructed as a common circuit. Accordingly, if such a signal processing circuit is formed as an IC, mass-production can be improved. In addition, in a solid-stage camera which is produced in accordance with the present invention, even if a sensor signal is directly stored in a memory, interchangeability is not impaired. Accordingly, the sensor signal can be directly recorded in the memory, whereby the utilization efficiency of the memory can be improved.

Figure 12:
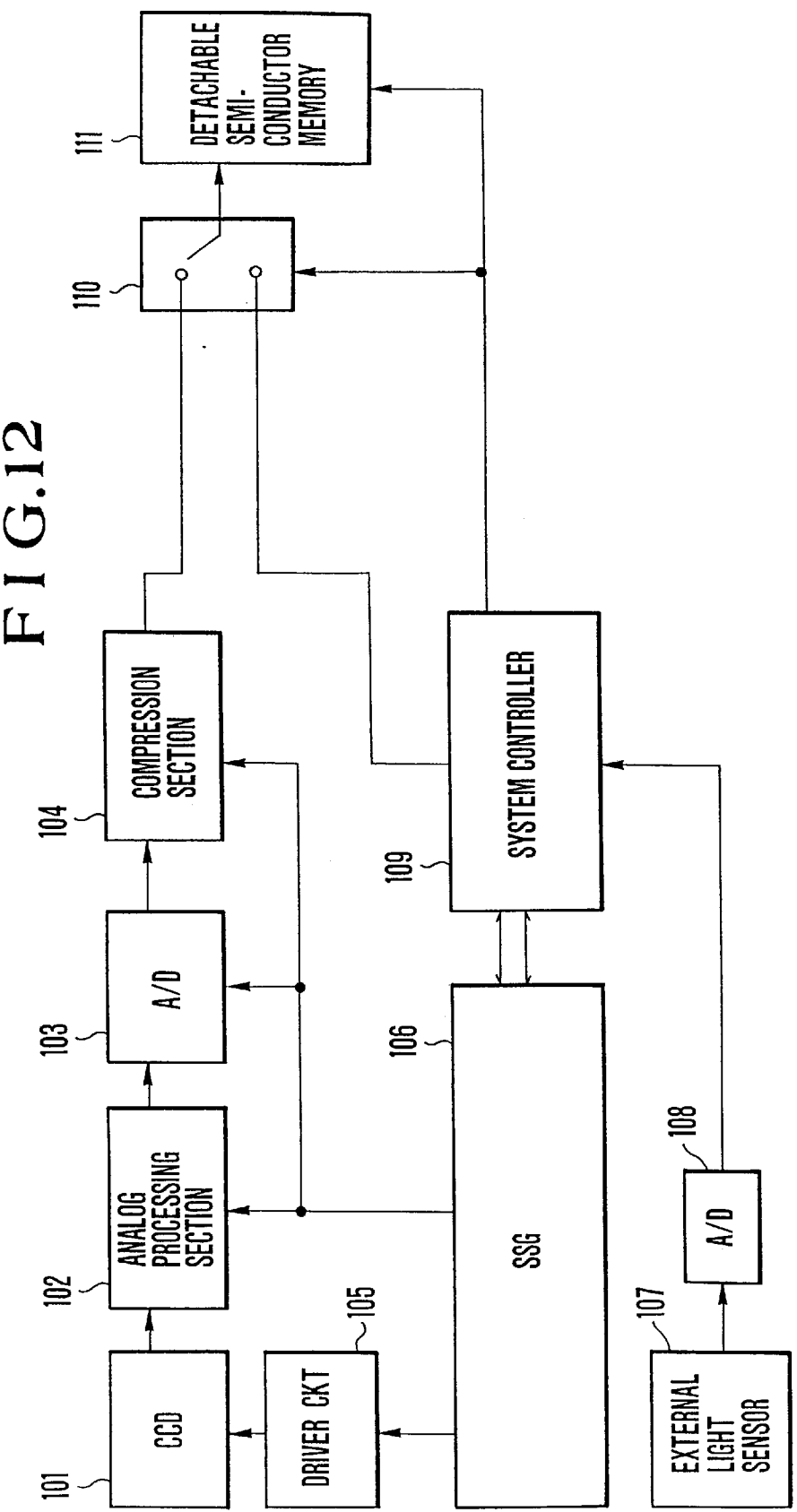
FIG. 12 is a block diagram showing the arrangement of another embodiment of an image recording apparatus according to the present invention.

FIG. 12 is a block diagram showing the arrangement of an electronic camera to which another embodiment of the present invention is applied. In this embodiment, the information required to perform the processing, such as matrix calculations for reproduction, executed in the above-described embodiment is stored in a memory.

A CCD 101 is equipped with color separation filters such as those shown in FIGS. 13(A) to 13(C). A driver circuit 105 reads image signals for each frame from the CCD 101 in accordance with a timing signal supplied from a system signal generator (SSG) 106. The signal output form the CCD 101 is subjected to analog processing, such as correlated double sampling (CDS) and automatic gain control (AGC), in an analog processing section 102. The processed signal is converted into a digital signal in an A/D converter 103.

The digitized signal is compressed by a DPCM or DTC technique in a compressing section 104.

A single image is recorded on a detachable semiconductor memory 111 in the following manner.

First of all, a system controller 109 switches the switch 110 so that the information on the CCD 101 which is output from the system controller 109 can be written to the semiconductor memory 111.

Figure 14:
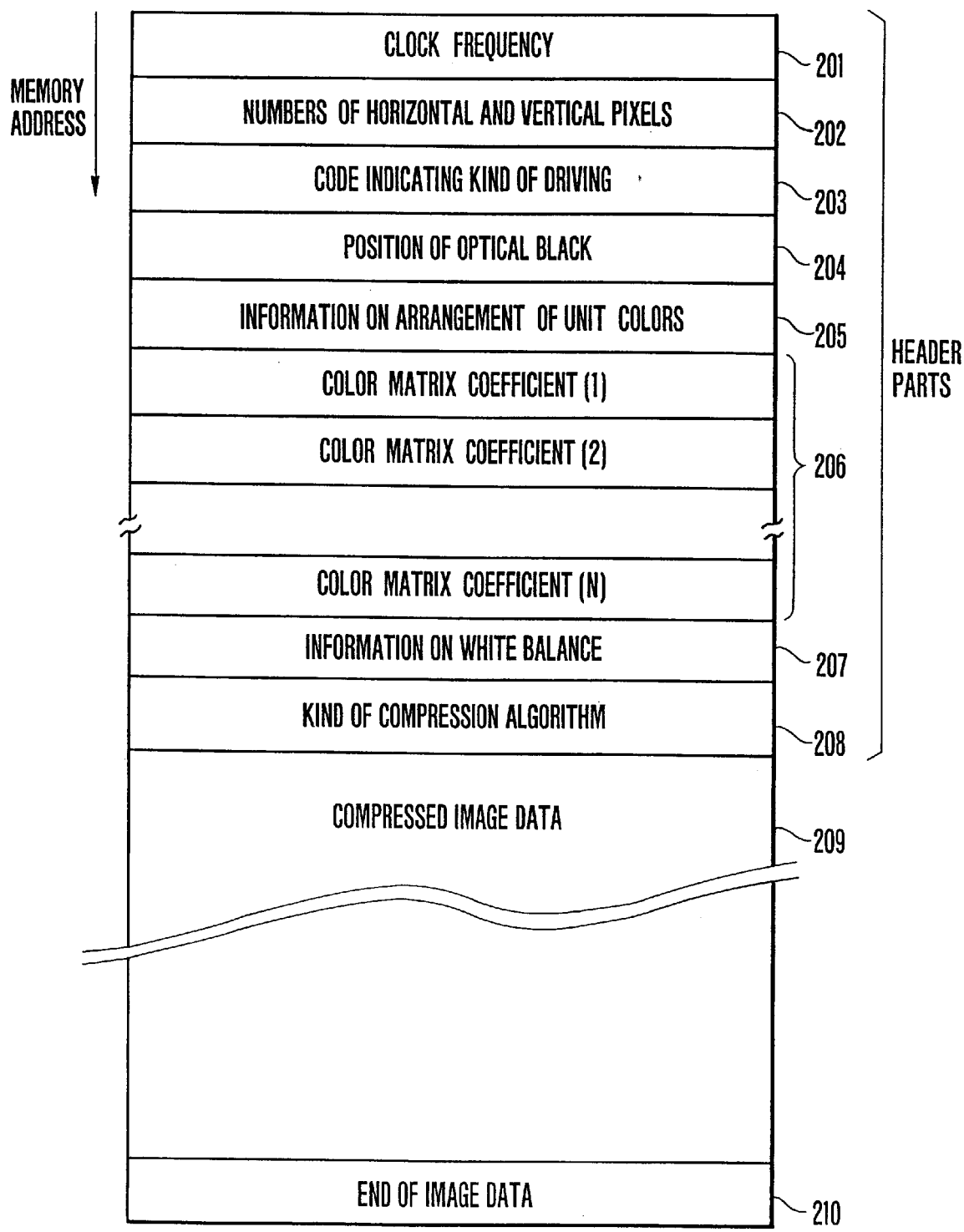
FIG. 14 is a view showing the contents of the memory used in the embodiment of FIG. 12.

The information is, as shown in FIG. 14, written to header parts 201 to 208 which correspond to a single image.

Written to the header part 201 is the frequency of a horizontal clock pulse for driving the CCD 101.

Written to the header part 202 is the number of pixels of the CCD 101 which are arranged in each of the horizontal and vertical directions.

A method of driving the CCD 101 is written to the header part 203. The contents to be written include encoded information on whether an interlace method or a non-interlace method has been selected, whether frame recording or field recording has been selected, and so on.

Written to the header part 204 are the start position of a light shielding portion (optical black) provided on the CCD 101 and the end position of the same.

Figures 15A, 15B:
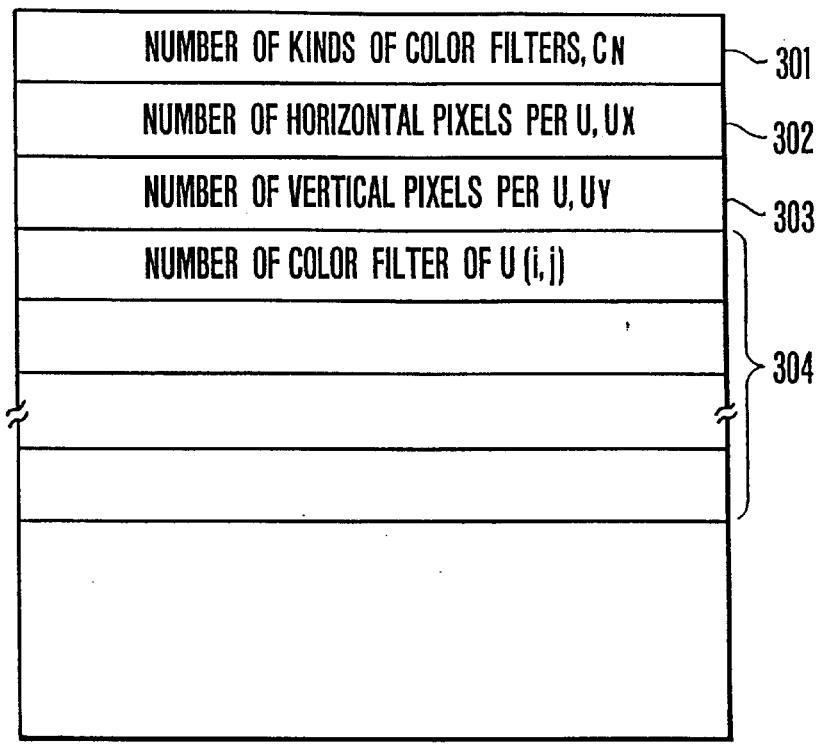
FIGS. 15(A) and 15(B) are views showing the contents of a part of the memory shown in FIG. 14.

Information representing the kind of color filter assembly is written to the header part 205 in the manner shown in FIG. 15(A).

A number $C_N$ of the kinds of color filter is written to a portion 301, and the number $U_X$ of pixels arranged in the horizontal direction is written to a portion 302 in the repetition unit U of each color filter, while the number $U_y$ of pixels arranged in the vertical direction is written to a portion 303 in the same unit. A portion 304 includes $U_X \times U_Y$ elements, and data on which of color filters 1 to $C_N$ corresponds to the U(i, j) is written by scanning form top left corner to top right corner of the repetition unit U.

FIG. 15(B) shows the specific contents of information to be written in the arrangement shown in FIG. 15(A) when the color arrangements of FIGS. 13(A) to 13(C) are employed. Each symbol "–" represents that nothing is to be written. Although the names and numbers 1 to $C_N$ of individual colors may be arbitrarily determined, one-to-one correspondence is needed between these numbers and the order of writing coefficients for reproducing primary colors.

Matrix coefficients suitable for use in converting color signals corresponding to the $C_N$ color filters to R, G and B signals by matrix calculations are written to the header part 206. For example, in the filter arrangement shown in FIG. 13(A), it is assumed that the following relation is obtained:

$$\begin{bmatrix} R \\ G \\ B \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix} \times \begin{bmatrix} M_g \\ G_r \\ C_y \\ Y_e \end{bmatrix} \quad (1)$$

In FIG. 15(B), $M_g$, $G_r$, $C_y$ and $Y_e$ correspond to 1, 2, 3 and 4, respectively. Accordingly, twelve data are written as the color matrix coefficients in the order: $a_{11} \to a_{12} \to a_{13} \to a_{14} \to a_{21} \to a_{22} \to a_{23} \to \ldots \to a_{34}$.

A correlative color temperature, measured when an image of interest is recorded, is estimated from color temperature information obtained by converting the output of an external light sensor 107 from analog form to digital form. The correlative color temperature is written to the header part 207.

Written to the header part 208 is a code which represents the kind of algorithm used for compression.

When the above-described operations have been completed, the system controller 109 switches the switch 110 to write the compressed image data to the detachable semiconductor memory 111 by driving the CCD 101 at an appropriate timing.

Figure 16:
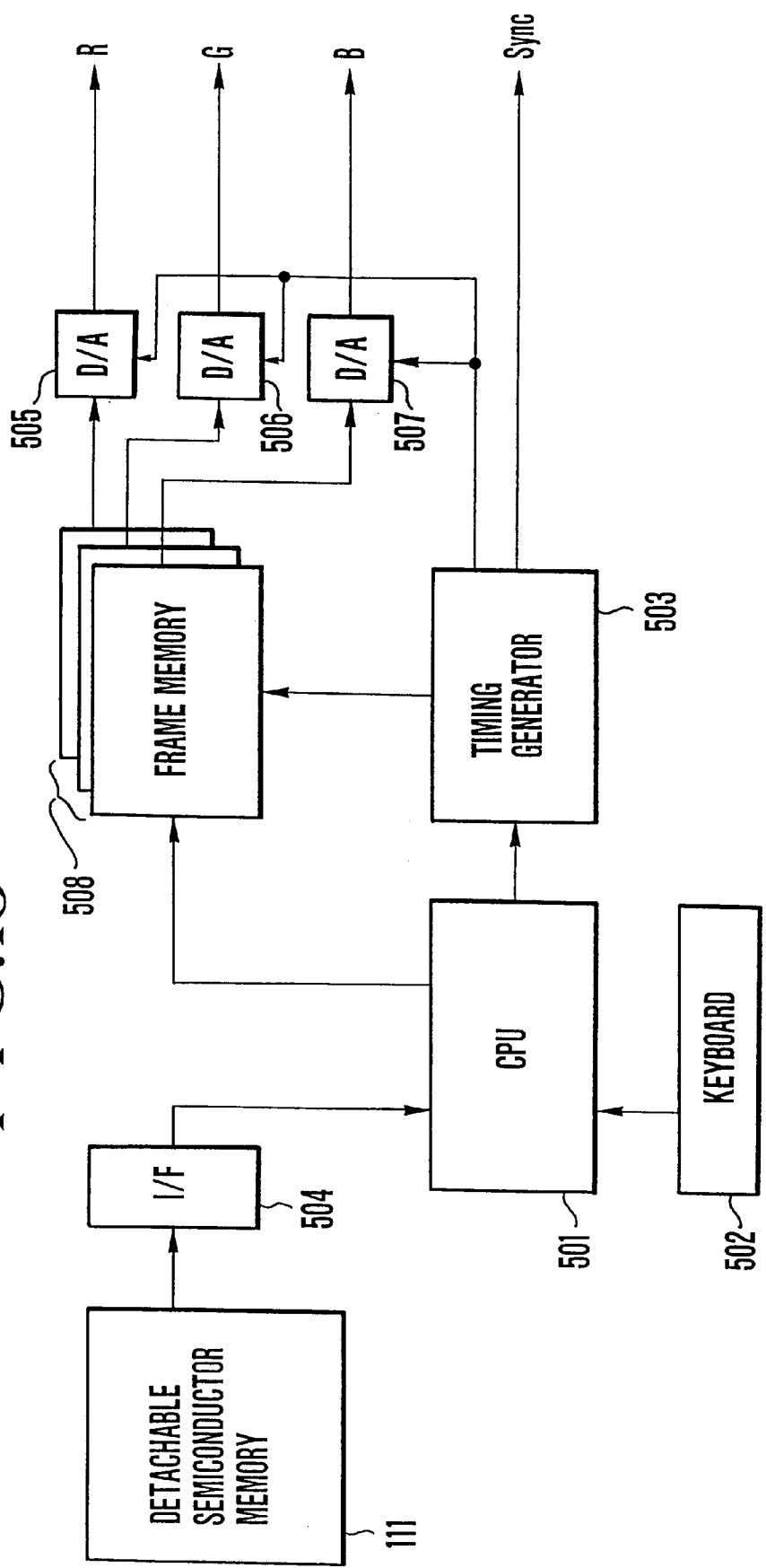
FIG. 16 is a block diagram showing a reproducing apparatus according to another embodiment of the present invention.

FIG. 16 is a block diagram showing the arrangement of an apparatus for processing the thus-written data and reproducing it as an image.

The detachable semiconductor memory 111 is connected to a central processing unit (CPU) 501 through an appropriate interface 504.

Figure 17:
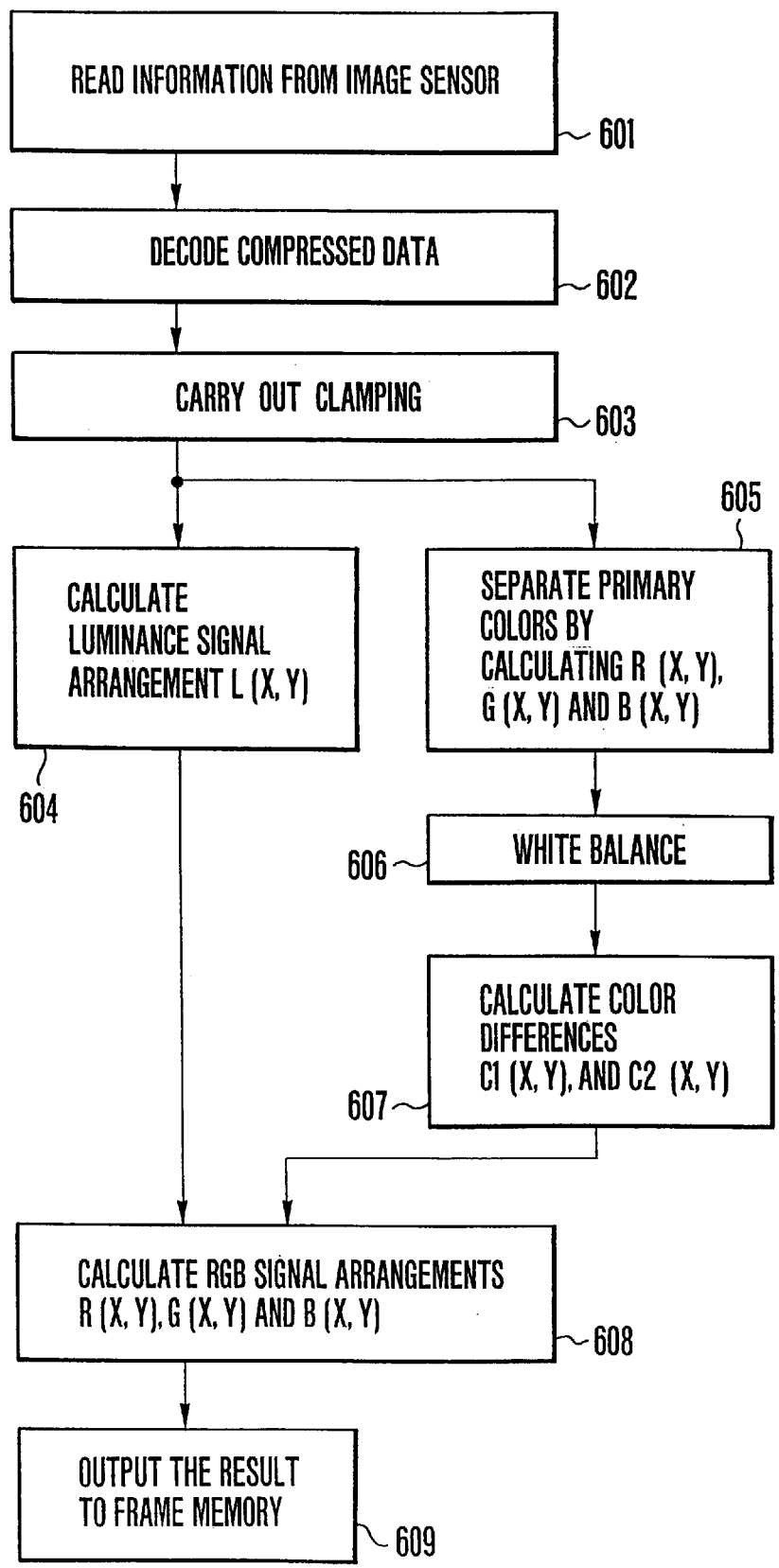
FIG. 17 is a flowchart showing the routine executed by the reproducing apparatus of FIG. 16.

The CPU 501 performs a reproducing operation in accordance with the flow chart of FIG. 17 which is stored as software.

In Step 601, the CPU 501 reads the various kinds of information on the characteristics of the CCD 101 from the header parts 201 to 208 shown in FIG. 14.

In Step 602, the CPU 501 performs decoding (expansion) which corresponds to the compression algorithm written to the header part 208, and decodes the compressed image data into original image data P(x, Y). In this step, the numbers of pixels in the respective horizontal and vertical directions and codes indicating the kind of driving which are written to the header parts 202 and 203, are indispensable.

Then, in Step 603, the CPU 501 performs software clamping. If the leading and trailing addresses of the optical black written to the header part 204 are represented by Xs and Xe, respectively, the following calculations are performed:

$$P(X, Y) = P(X, Y) - \{1/(X_e - X_s + 1)\}^t \sum_{t=X_s}^{X_e} P(t, Y) \qquad (2)$$

Thus, the software clamping is performed.

Then, in Step 604, the CPU 501 generates a luminance signal L (X, Y) from the array shown by Equation (2).

Calculations for use in producing the luminance signal L(X,Y) from the original image data P(X, Y) include low-pass filtering $H_1(X, Y)$ and high-frequency emphasis filtering $H_2(X, Y)$ used for contour correction.

The following calculations are performed:

$$L(X,Y)=H_1(X, Y)\hat{x}p(X, Y)+\alpha H_2(X, Y)\hat{x}P(X, Y) \qquad (3)$$

"$\hat{x}$" represents convolution calculations, and the following equation is obtained:

$$H(X, Y) \otimes P(X, Y) = \sum_i \sum_j H(i, j) P(X - i, Y - j) \qquad (4)$$

where i and j are varied within the range of H(X, Y).

For example, the low-pass filtering $H_1(X, Y)$ may be one-dimensional filtering of the form:

$$H_1(X, Y) = \frac{1}{25}[1, 2, 3, 4, 5, 4, 3, 2, 1] \qquad (5)$$

In this case, since H(X, Y)=O and Y=1, it suffices to vary i from 1 to 9 for j=1.

It is desirable that the high-frequency emphasis filtering $H_2(X, Y)$ be two-dimensional filtering of the form:

$$H_2(X, Y) = \begin{bmatrix} 1 & -2 & 1 \\ -2 & 4 & -2 \\ 1 & -2 & 1 \end{bmatrix} \qquad (6)$$

The frequency characteristics obtained when the respective calculations are carried out vary with a clock frequency $f_C$ which is written to the header part 201.

For instance, for the clock frequency $f_C'$ the frequency characteristic H(f) of the low-pass filtering $H_1(X, Y)$ expressed by Equation (5) is given by $$H_1(f) = \frac{1}{25}(5 + 8\cos\omega + 6\cos 2\omega + 4\cos 3\omega + 2\cos 4\omega) \qquad (7)$$

where $\omega = 2\pi f/f_C$.

As can be seen from Equation (7), $H_1(f)$ varies with $f_C$ and, therefore, as $f_C$ varies, the coefficient of $H_1(X, Y)$ needs to be varied so that substantially the same frequency characteristics can be steadily obtained. Accordingly, in Step 604, information on the clock frequency written to the header part 201 is indispensable. If a user actuates a keyboard 502, the strength $\alpha$ of the high-frequency emphasis in Equation (3) can be arbitrarily adjusted from the outside.

The keyboard 502 may be replaced with other external adjustment means such as a volume.

Finally, the following gamma conversion may be performed:

$$L(X, Y) = \left[\frac{L(X, Y)}{\text{MAX}}\right]^\gamma \times \text{MAX} \qquad (8)$$

Where, if L(X,Y) consists of N bits, MAX is $2^N - 1$.

In Step 605, primary-color separating signals $R_L(X, Y)$, $G_L(X, Y)$ and $B_L(X, Y)$ are calculated from the original image data P(X, Y).

For example, in the arrangement shown in FIG. 13(A), $M_g(X, Y)$ is calculated.

The information on the arrangement of unit colors, which is written to the header part 205, is used to set to zero all the data other than the data corresponding to the color filter No. 1 in P(X, Y), thereby producing $M_g'(X, Y)$.

Then, $M_g(X, Y)$ is obtained by the convolution of $M_g'(X, Y)$ and interpolation filtering F(X, Y).

$$M_g(X, Y) = F(X, Y)\hat{x}M_g'(X, Y) \qquad (9)$$

For example, in the arrangement shown in FIG. 13(A), it is preferable that the interpolation filtering F(X, Y) be of the form:

$$F(X, Y) = \begin{bmatrix} 1/4 & 1/2 & 1/4 \\ 1/2 & 1 & 1/2 \\ 1/4 & 1/2 & 1/4 \end{bmatrix} \qquad (10)$$

Similarly, $G_r(X, Y)$, $C_y(X, Y)$ and $Y_e(X, Y)$ are each obtained.

Then, matrix coefficient information $(a_{i,j})$ written to the header part 206 is used to perform the following calculations:

$$\begin{bmatrix} R_L(X, Y) \\ G_L(X, Y) \\ B_L(X, Y) \end{bmatrix} = (a_{i,j}) \begin{bmatrix} M_g(X, Y) \\ G_r(X, Y) \\ C_y(X, Y) \\ Y_e(X, Y) \end{bmatrix} \qquad (11)$$

In Step 606, the CPU 501 executes white-balance control, that is to say, the CPU 501 multiplies $R_L(X, Y)$, $G_L(X, Y)$ and $B_L(X, Y)$ by the relative-color-temperature information read from the header part 207, as follows:

$$\begin{aligned} R_L(X, Y) &\leftarrow GR(T) \times R_L(X, Y) \\ G_L(X, Y) &\leftarrow GG(T) \times B_L(X, Y) \\ B_L(X, Y) &\leftarrow GB(T) \times B_L(X, Y) \end{aligned} \qquad (12)$$

where T represents the relative color temperature and, as T rises, GR(T) increases but GB(T) decreases. GG(T) may be made one.

In Step 607, the CPU 501 calculates color-differences $C_1(X, Y)$ and $C_2(X, Y)$.

The CPU 501 performs calculations represented by $$Y_L(X, Y)=0.30R_L(X, Y)+0.59G_L(X, Y)+0.11B_L(X, Y) \qquad (13)$$

and then, $$C_1(X, Y)=Y_L(X, Y)-R_L(X, Y) \quad C_2(X, Y)=Y_L(X, Y)-B_L(X, Y) \qquad (14)$$

In Step 608, the CPU 501 uses the calculation results obtained in Steps 604 and 607 to calculate $$R(X, Y)=-C_1(X, Y)+L(X, Y) \; B(X, Y)=-C_2(X, Y)+L(X, Y) \; G(X, Y)=\tfrac{1}{0.59}[L(X, Y)-0.30R(X, Y)-0.11B(X, Y)] \qquad (15)$$

In Step 609, the CPU 501 writes the calculation results R(X, Y), G(X, Y) and B(X, Y) to a frame memory 508 shown in FIG. 16.

These data R(X, Y), G(X, Y) and B(X, Y) are converted by D/A converters 505, 506 and 507, respectively, thereby providing corresponding analog R, G and B signals.

In accordance with the embodiment described above, it is possible to assure the interchangeability of different kinds of image sensors among systems in which data is directly written. Accordingly, it is possible to realize an electronic camera provided with a low-cost, small-size and detachable memory which can record an increased number of images.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electronic camera, comprising:
   an image sensor,
   a recording device adapted to record, on detachable memory, an image signal of an optical black and an image signal which is not performed clamping and different from the image signal of said optical black, output by said image sensor and information about coordinates of said optical black on said image sensor.

2. An electronic camera according to claim 1, wherein said image sensor includes a CCD.

3. An electronic camera according to claim 1, wherein said image sensor is arranged to receive image light transmitted from an object through a color separation filter assembly.

4. An electronic camera according to claim 1, wherein said information indicative of the characteristics of the image sensor is recorded in header portion of data of the image signal to be recorded in the memory.

5. An image reproducing apparatus, comprising:
   a reading device arranged to read, from detachable memory, an image signal of an optical black and an image signal which is not performed clamping and different from the image signal of said optical black, output by an image sensor and information about coordinates of said optical black on said image sensor; and
   a reproducing device arranged to read clamping of the image signal on the basis of the information.

6. An image recording apparatus according to claim 5, wherein said information indicative of the characteristics of the image sensor is recorded in a header portion of data of the image signal to be recorded on the memory.

7. An image reproducing apparatus according to claim 5, wherein said image sensor includes a CCD.

8. An image reproducing apparatus according to claim 5, wherein said image sensor is arranged to receive image light transmitted from an object through a color separation filter assembly.

9. A method for recording an image signal output by an image sensor, comprising the steps of:
   providing first image signal of an optical black and second image signal which is not performed clamping and different from said first image signal output by said image sensor,
   recording, on detachable memory, said first and second image signal and information about coordinates of said optical black on said image sensor.

10. A method for reproducing an image signal, comprising the steps of:
    reading, from detachable memory, an image signal of an optical black and an image signal which is not performed clamping and different from the image signal of said optical black, output by an image sensor and information about coordinates of said optical black on said image sensor; and
    reproducing by performing clamping of the image signal on the basis of the information.

11. An electronic camera comprising:
    an image sensor; and
    a recording unit which records, on removable memory, a first image signal of an optical black, and a second image signal which is different from the first image signal, each of which is output by said image sensor, wherein said recording unit records the first image signal and the second image signal in different areas of the removable memory.

12. An image reproducing apparatus comprising:
    a reading unit which reads, from removable memory, a first image signal of an optical black, and a second image signal which is different from the first image signal, each of which is output by an image sensor; and
    a reproducing unit which performs clamping of the second image signal on the basis of die first image signal, wherein said first image signal and the second image signal are recorded in different areas of the removable memory.

13. An electronic camera comprising:
    an image sensor; and
    a recording unit which records, on removable memory, distinguishably between a first image signal of an optical black and a second image signal different from the first image signal, each of which is output by said image sensor.

14. An image reproducing apparatus, comprising;
    a reading unit which reads, from removable memory, a first image signal of an optical black, and a second image signal which is different from the first image signal, each of which is output by an image sensor; and
    a reproducing unit which performs clamping of the second image signal on the basis of the first image signal, wherein said first image signal and the second image signal are recorded distinguishably.

15. A method for recording an image signal output by an image sensor, comprising the steps of: providing a first image signal of an optical black and a second image signal which is different from the first image signal, each of which is output by said image sensor; and
    recording the first image signal and the second image signal in different areas of removable memory.

16. A method for reproducing an image signal, comprising the steps of:
    reading, from removable memory, a first image signal of an optical black and a second image signal which is different from the first image signal, each of which is output by an image sensor; and
    performing clamping of the second image signal on the basis of the first image signal, wherein the first image signal and the second image signal are recorded in different areas of the removable memory.

17. A method for recording an image signal output by an image sensor, comprising the steps of:

providing a first image signal of an optical black and a second image signal different from the first image signal, each of which is output by said image sensor; and recording, on removable memory, distinguishably between the first image signal of the optical black and the second image signal which is different from the first image signal, each of which is output by said image sensor.

18. A method for reproducing an image signal, comprising the steps of:

reading, from removable memory, a first image signal of an optical black and a second image signal which is different from the first image signal, each of which is output by an image sensor; and performing clamping of the second image signal on the basis of the first image signal, wherein the first image signal and the second image signal are recorded distinguishably.

* * * * *

UNITED STATES PATENT AND TRADEMARK OFFICE
CERTIFICATE OF CORRECTION

PATENT NO. : 6,515,698 B1
DATED : February 4, 2003
INVENTOR(S) : Takashi Sasaki et al.

It is certified that error appears in the above-identified patent and that said Letters Patent is hereby corrected as shown below:

Title page,
Item [54], delete in its entirety and insert -- ELECTRONIC CAMERA HAVING MEMORY STORING IMAGE DATA AND DATA INDICATIVE OF CHARACTERISTICS OF AN IMAGE SENSOR --.

Column 1,
Line 4, after "1993" insert -- is now Pat. No. 5,719,624, --.

Column 3,
Line 30, after "filters:" insert -- complementary color filters and pure color filters. For this reason, such an electronic camera is arranged --.

Column 6,
Line 47, delete "t" and insert -- $\ell$ --.
Line 52, delete "$Y_2$" and insert -- $y_2$ --.

Column 8,
Line 59, delete "P(x, Y)." and insert -- P(X, Y). --.

Column 9,
Line 1, delete "+ 1)}$^+$" and insert -- + 1)} --.

Line 15, delete "$\hat{x}$" in all instances and insert -- X --.

Line 18, delete ""$\hat{x}$"" insert -- X --.

Line 46, delete "$f_{c'}$" and insert -- f , --.

Column 10,
Line 18, delete "$\hat{x}$" and insert -- X --.

UNITED STATES PATENT AND TRADEMARK OFFICE
CERTIFICATE OF CORRECTION

PATENT NO.     : 6,515,698 B1
DATED          : February 4, 2003
INVENTOR(S)    : Takashi Sasaki et al.

It is certified that error appears in the above-identified patent and that said Letters Patent is hereby corrected as shown below:

Column 12,
Line 27, delete "die" and insert -- the --.
Line 50, before "providing a first" insert a new paragraph.

Signed and Sealed this

Second Day of December, 2003

JAMES E. ROGAN
*Director of the United States Patent and Trademark Office*